United States Patent
Liu et al.

(10) Patent No.: US 9,240,294 B2
(45) Date of Patent: Jan. 19, 2016

(54) TOUCH PAD MODULE HAVING A CIRCUIT BOARD INCLUDING A RECESSED AREA AND ELECTRONIC DEVICE USING THE SAME

(71) Applicant: Acer Incorporated, New Taipei (TW)

(72) Inventors: Chia-Chieh Liu, New Taipei (TW); Wen-Chieh Tai, New Taipei (TW); Cheng-Nan Ling, New Taipei (TW); Hsien-Wei Chen, New Taipei (TW); Chun-I Chen, New Taipei (TW); Yi-Ta Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 145 days.

(21) Appl. No.: 14/028,513

(22) Filed: Sep. 16, 2013

(65) Prior Publication Data
US 2015/0008113 A1 Jan. 8, 2015

(30) Foreign Application Priority Data
Jul. 5, 2013 (TW) .............................. 102124193 A

(51) Int. Cl.
*H01H 13/10* (2006.01)
*H01H 13/14* (2006.01)
*G06F 3/041* (2006.01)
*H01H 3/02* (2006.01)

(52) U.S. Cl.
CPC ............... *H01H 13/10* (2013.01); *G06F 3/041* (2013.01); *H01H 13/14* (2013.01); *H01H 2003/0293* (2013.01); *H01H 2209/004* (2013.01); *H01H 2209/024* (2013.01); *H01H 2239/074* (2013.01)

(58) Field of Classification Search
CPC .................. G06F 3/03547; G06F 2203/04105; G06F 3/0362; G06F 3/0414; H01H 1/0201; H01H 2003/0293; H01H 2025/048; H01H 2225/03; H01H 13/10; H01H 13/14; H01H 2209/004; H01H 2209/024; H01H 2239/074
See application file for complete search history.

(56) References Cited

U.S. PATENT DOCUMENTS

| 5,552,571 | A * | 9/1996 | Runge .................... H01H 13/10 200/243 |
| 2002/0149570 | A1* | 10/2002 | Knowles et al. ............... 345/173 |
| 2003/0094354 | A1* | 5/2003 | Badarneh .............. G06F 3/0338 200/18 |
| 2003/0132301 | A1* | 7/2003 | Selker ............................. 235/487 |
| 2003/0151103 | A1* | 8/2003 | Endo et al. .................... 257/414 |
| 2006/0250377 | A1* | 11/2006 | Zadesky et al. ............... 345/173 |
| 2009/0272639 | A1* | 11/2009 | Mittleman et al. ............ 200/345 |
| 2011/0036693 | A1* | 2/2011 | Lin ...................... H01H 13/023 200/314 |
| 2011/0254786 | A1* | 10/2011 | Wen et al. ...................... 345/173 |
| 2011/0254788 | A1* | 10/2011 | Wang et al. .................... 345/173 |
| 2011/0255242 | A1* | 10/2011 | Shao et al. ................ 361/679.55 |

(Continued)

FOREIGN PATENT DOCUMENTS

| CN | 201417417 Y | 3/2010 |
| TW | 200809065 | 2/2008 |

*Primary Examiner* — Lun-Yi Lao
*Assistant Examiner* — Elliott Deaderick
(74) *Attorney, Agent, or Firm* — Jianq Chyun IP Office

(57) ABSTRACT

A touch pad module includes a circuit board and a trigger element. The circuit board includes a recessed area. The trigger element is disposed on the circuit board and covers the recessed area. When the trigger element deforms by an external force, at least a part of the trigger element is located in the recessed area.

14 Claims, 8 Drawing Sheets

(56) References Cited

U.S. PATENT DOCUMENTS

| | | | |
|---|---|---|---|
| 2012/0099264 A1* | 4/2012 | Degner | G06F 1/1616 361/679.09 |
| 2012/0168294 A1* | 7/2012 | Pegg | 200/520 |
| 2013/0026017 A1* | 1/2013 | Verd Martinez | H01H 9/161 200/307 |
| 2014/0268628 A1* | 9/2014 | Mann | G08C 17/00 362/23.1 |

* cited by examiner

TOUCH PAD MODULE HAVING A CIRCUIT BOARD INCLUDING A RECESSED AREA AND ELECTRONIC DEVICE USING THE SAME

CROSS-REFERENCE TO RELATED APPLICATION

This application claims the priority benefit of Taiwan application serial no. 102124193, filed on Jul. 5, 2013. The entirety of the above-mentioned patent application is hereby incorporated by reference herein and made a part of this specification.

FIELD OF THE INVENTION

The invention relates to a touch pad module and an electronic device using the same.

DESCRIPTION OF THE RELATED ART

Recently, with the progress in technologies, electronic devices such as notebook computer (NB), tablet PC and smart phones have been extensively used in daily life. Styles and functions of electronic devices are more and more diverse. Convenience and practicality make these electronic devices more popular and can be used for various purposes.

An electronic device, such as a notebook computer, is usually configured with a keyboard module and a touch pad module as input interfaces for an electronic device. A touch pad of the touch pad module usually corresponds to a switch, such that a user triggers the switch disposed inside the electronic device by touching the touch pad disposed outside the electronic device. However, in a processing of miniaturizing and streamlining an electronic device, an integrated design of a touch pad and keyboard can save a layout space of the electronic device and provide greater touch and control area for user operations, but press strokes are too short between the touch pad and the switch and it causes indefinite pressing feelings for the user when operating. Therefore, a solution of how to generate greater press strokes in limited space while reducing noises generated from operating the touch pad is highly desired.

SUMMARY OF THE INVENTION

The invention provides a touch pad module, which has greater press stroke and better press feeling to a user, and can effectively reduce noises generated by operations.

An embodiment of the invention provides a touch pad module suitable for an electronic device. The touch pad module includes a circuit board and a trigger element. The circuit board includes a recessed area. The trigger element is disposed on the circuit board and covers the recessed area. When the trigger element deforms by an external force, at least a part of the trigger element is located in the recessed area.

An embodiment of the invention provides an electronic device including a housing, a touch pad, a circuit board and a trigger element. The housing has an opening. The touch pad is disposed in the housing, and a touch surface of the touch pad exposes the housing from the opening. The circuit board is disposed in the housing and has a recessed area. The trigger element is disposed on the circuit board. The trigger element covers a top of the recessed area, and is disposed between the touch pad and the circuit board, wherein when the trigger element deforms by an external force, at least a part of the trigger element is located in the recessed area.

In light of the above, in the aforesaid embodiment of the invention, by covering the top of the recessed area of the circuit board, the part of the trigger element is located in the recessed area when the trigger element is subject to an external force to deform. Accordingly, a greater press stroke to the trigger element is substantially increased, such that the user has better pressing feeling, and the recessed area also can effectively reduce noises generated by operating the touch pad.

To make the aforesaid features and advantages of the invention more comprehensible, several embodiments accompanied with drawings are described in details as follows.

DESCRIPTION OF EMBODIMENTS

Figure 1:
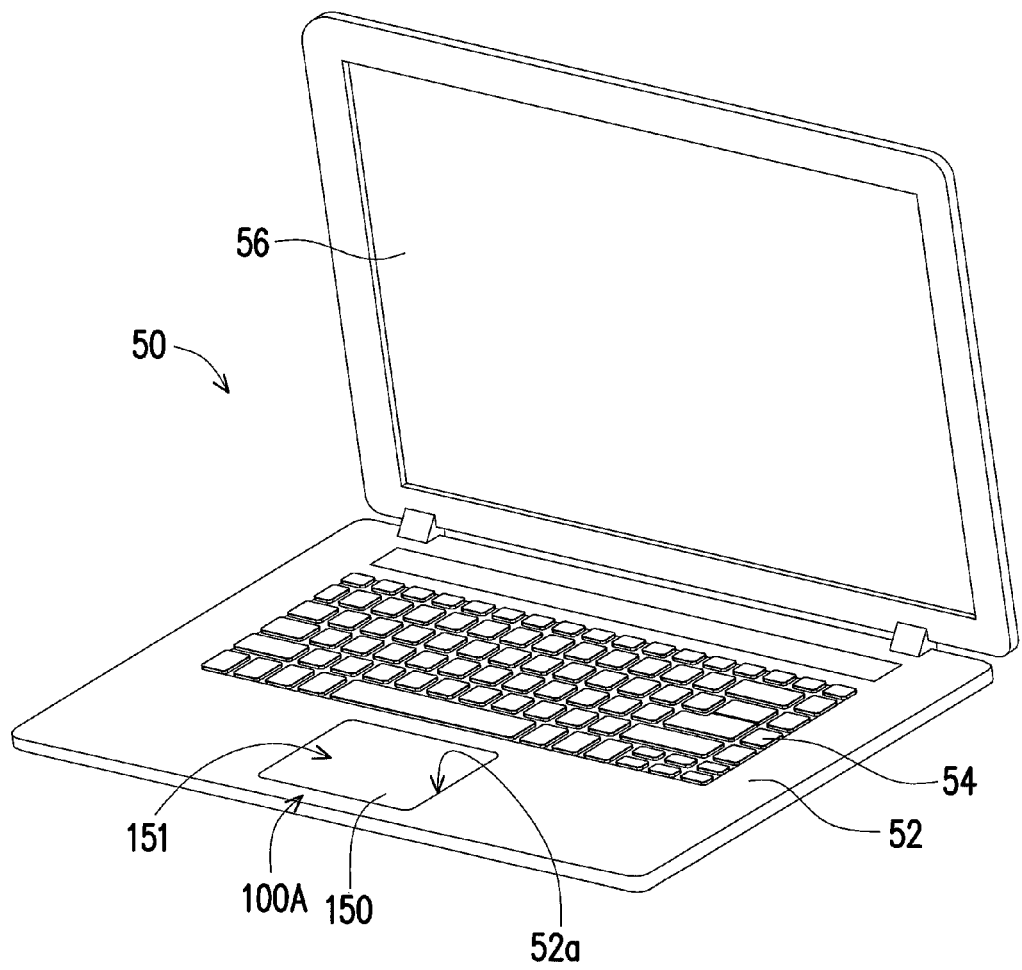
FIG. 1 is a schematic view of an electronic device according to one embodiment of the invention.

FIG. 1 is a schematic view of an electronic device according to one embodiment of the invention. Referring to FIG. 1. In the present embodiment, an electronic device 50 includes a housing 52 and a touch pad module 100A. The touch pad module 100A is disposed in the housing 52 of the electronic device 50, wherein the housing 52 has an opening 52a, and the housing 52 exposes a touch surface 151 of a touch pad 150 of the touch pad module 100A from the opening 52a for a user to control the electronic device 50 by operating the touch pad module 100A. The electronic device 50, for example, is a notebook computer and has a keyboard 54 and a display unit 56, but the invention does not limit varieties of the electronic device 50. Any electronic device using the touch pad module 100A as an input interface is suitable for the present embodiment.

Figure 2:
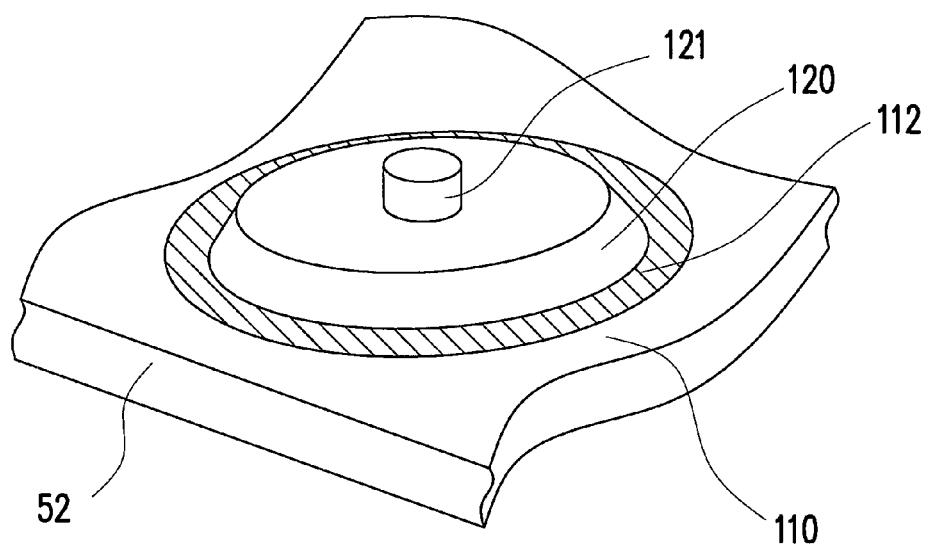
FIG. 2 is a partial enlarged view illustrating the touch pad module of FIG. 1.
Figure 3A:
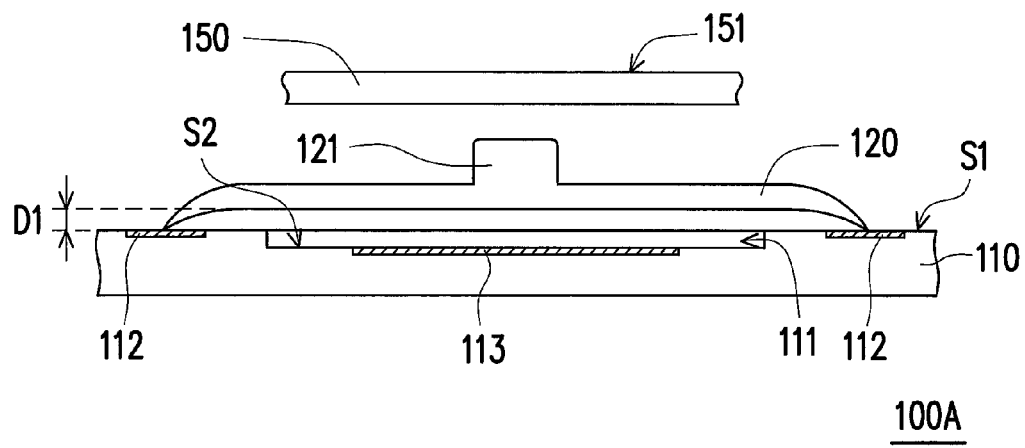
FIG. 3A is a partial cross-sectional view illustrating the touch pad module of FIG. 1.
Figure 3B:
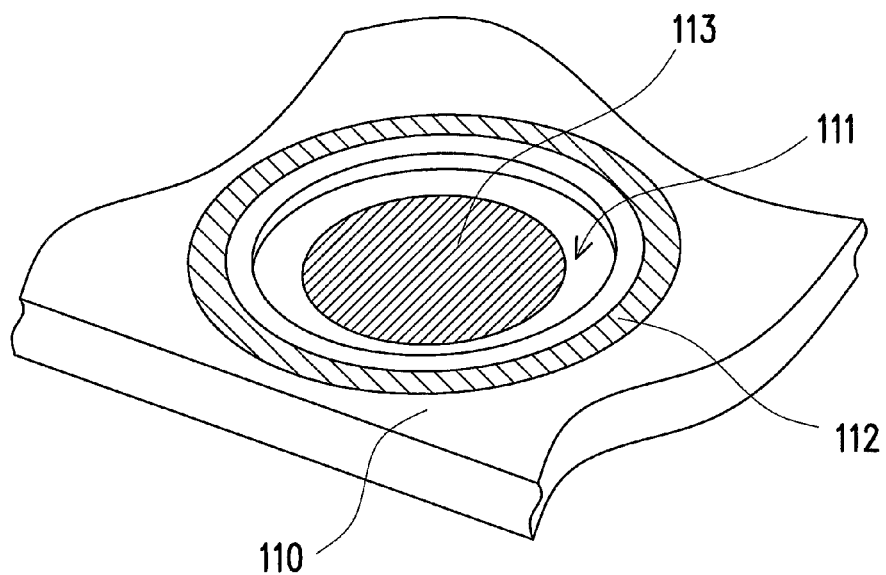
FIG. 3B is a schematic view illustrating the circuit board of FIG. 3A.
Figure 3C:
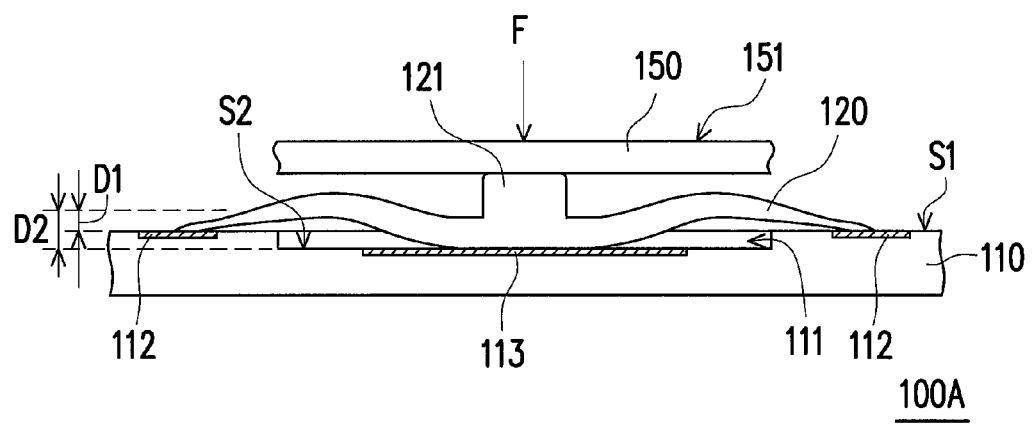
FIG. 3C is a partial cross-sectional view illustrating the touch pad module under an external force of FIG. 3A.

FIG. 2 is a partial enlarged view illustrating the touch pad module of FIG. 1. FIG. 3A is a partial cross-sectional view illustrating the touch pad module of FIG. 1. FIG. 3B is a schematic view illustrating the circuit board of FIG. 3A. FIG. 3C is a partial cross-sectional view illustrating the touch pad module under an external force of FIG. 3A. Referring to both FIG. 2 and FIG. 3A. In the present embodiment, a touch pad module 100A further includes a circuit board 110 and a trigger element 120. The circuit board 110 includes a recessed area 111. The trigger element 120 is disposed on the circuit board 110 and covers the recessed area 111, such that the trigger element 120 is located between the touch pad 150 and the circuit board 110. Generally speaking, the circuit board 110 can be a rigid printed circuit board (PCB) or a metal core printed circuit board (MCPCB), wherein the recessed area 111 is, for example, formed on the circuit board 110 by an etching or drilling process. As a result, a first surface S1 of the circuit board 110 and a second surface S2 of the recessed area 111 have a height difference therebetween. As shown in FIG. 3B, a base surface of the recessed area 111 is, for example, a circular shape. However, in other embodiment no illustrated herein, a base surface of the recessed area can also be an elliptic shape or a polygonal shape. The invention is not limited herein.

Referring to FIG. 3A and FIG. 3B. In the present embodiment, the circuit board 110 further includes a ground area 112 located in a first surface S1 and a touch and press operation area 113 located in a second surface S2, wherein the ground area 112 surrounds the recessed area 111 but is separated from the recessed area 111. Generally speaking, the ground area 112 and the press and touch area 113, for example, are circuit patterns formed on the circuit board 110 by methods such as electroplating, screen printing or spray printing. The trigger element 120, for example, is a dome-shaped metal reed and has elasticity. A periphery of the trigger element 120 is contacted against the ground area 112, such that the trigger element 120 is disposed on the first surface S1 of the circuit board 110, and a gap D1 exists between an uppermost part of the trigger element 120 and the circuit board 110.

Specifically speaking, the trigger element 120 of the present embodiment has a protrusion portion 121 facing toward the touch pad 150. As shown in FIG. 3C, when a user presses the touch surface 151, the touch 150 is contacted against the trigger element 120 by an external force F to further drive the touch pad 150 for moving down and contacting against the protrusion portion 121, such that the trigger element 120 deforms caused by receiving the external force F, wherein at least a part of the trigger element 120 moves in the recessed area 111 due to deformation, and is further contacted against the touch and press operation area 113 in the recessed area 111. Therefore, the touch and press operation area 113 and the ground area 112 are electrically connected through the trigger element 120 to generate an operating signal.

In the present embodiment, the trigger element 120 has a maximum amount deformation D2 greater than the gap D1. Since the circuit board 110 has the recessed area 111 which is big enough to accommodate a part of the trigger element 120 for generating the maximum amount of deformation D2, when compared with the conventional knowledge that a deformed trigger element is only contacted with a first surface, the circuit board 110 of the present embodiment provides greater pressing process, i.e., the circuit board 110 allows the trigger element 120 to generate elasticity of the maximum amount of deformation D2 in order to touch and press the touch and press operation area 113 located in the second surface S2, such that the user feels better and more definite pressing senses when operating the touch pad module 100A.

Figure 4A:
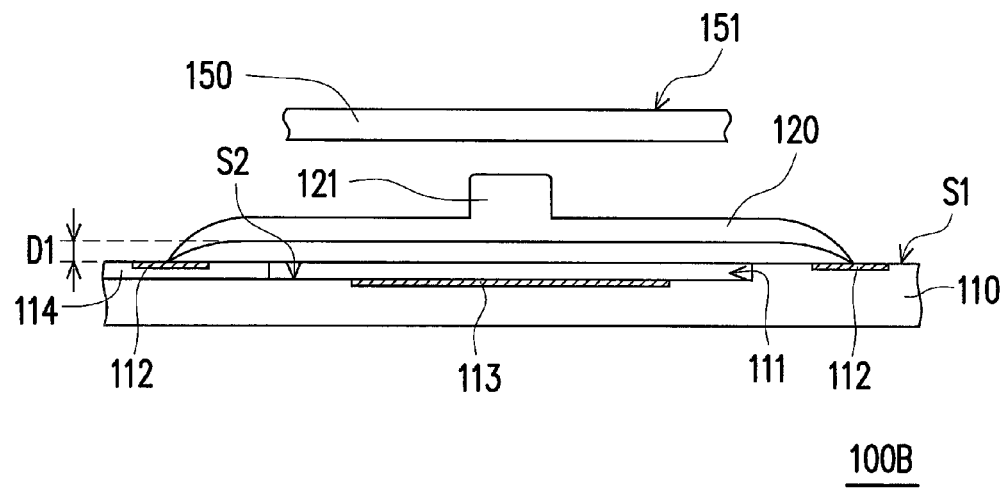
FIG. 4A is a partial cross-sectional view of a touch pad module according to another embodiment of the invention.
Figure 4B:
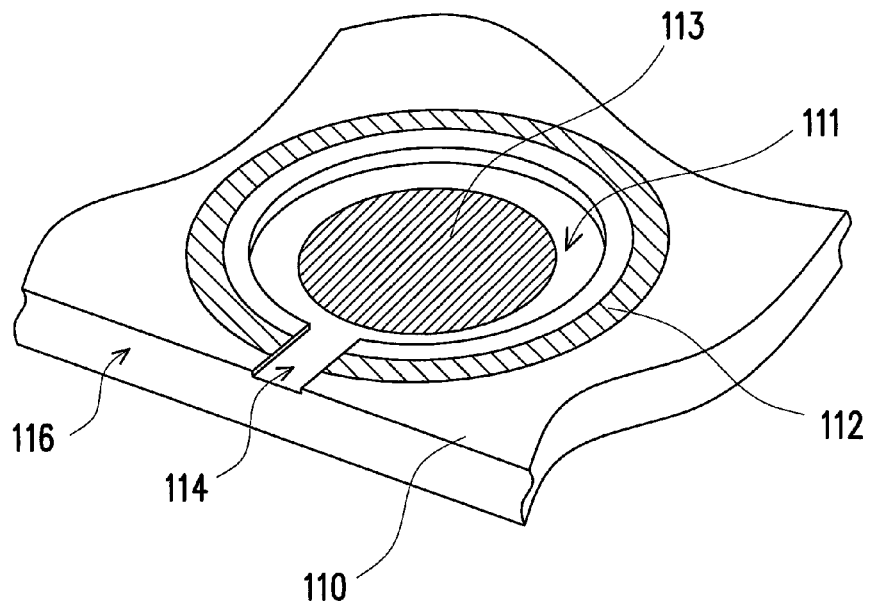
FIG. 4B is a schematic view illustrating the circuit board of FIG. 4A.

FIG. 4A is a partial cross-sectional view of a touch pad module according to another embodiment of the invention. FIG. 4B is a schematic view illustrating the circuit board of FIG. 4A. Referring to FIG. 4A and FIG. 4B. A touch pad module 100B of FIG. 4A is similar to the touch pad module 100A of FIG. 3A, and the difference lies in that: the circuit board 110 of the touch pad module 100B of the present embodiment further contains an airflow passage 114 connected between the recess area 111 and a lateral surface 116 of the circuit board 110. Generally speaking, the airflow passage 114, for example, is formed together with the recessed area 111 on the circuit board 110 by processes such as etching or drilling and milling. The airflow passage 114 is a channel configured for the recessed area 111 to connect to environment outside the circuit board 110, so as to prevent sound waves generated by pressing the trigger element 120 from vibrating in a hermetic space formed between the trigger element 120 and the recessed area 111. In other words, the airflow passage 114 is capable of effectively transmitting sound waves generated by the deformed trigger element 120 to the outside of the circuit board 110, thereby to reduce noises caused by operating the trigger element 120.

Figure 5A:
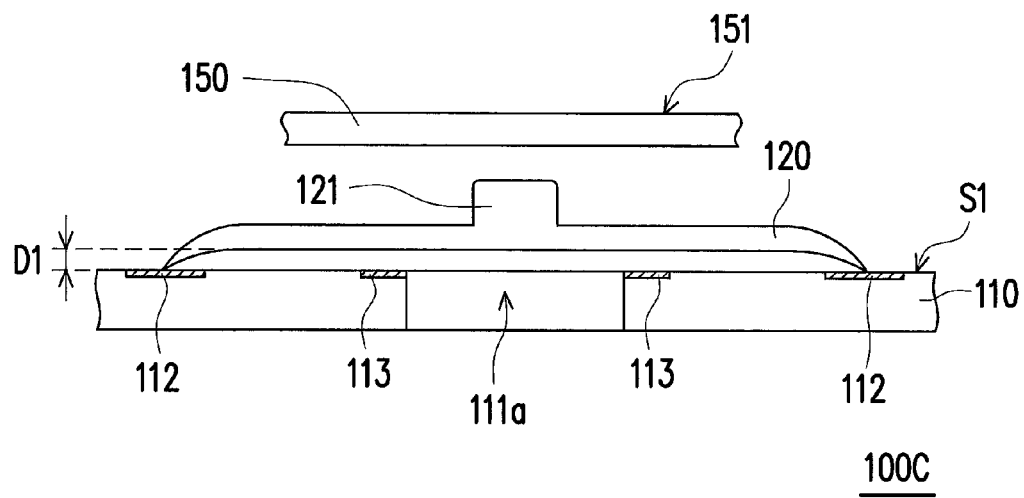
FIG. 5A is a partial cross-sectional view of a touch pad module according to another embodiment of the invention.
Figure 5B:
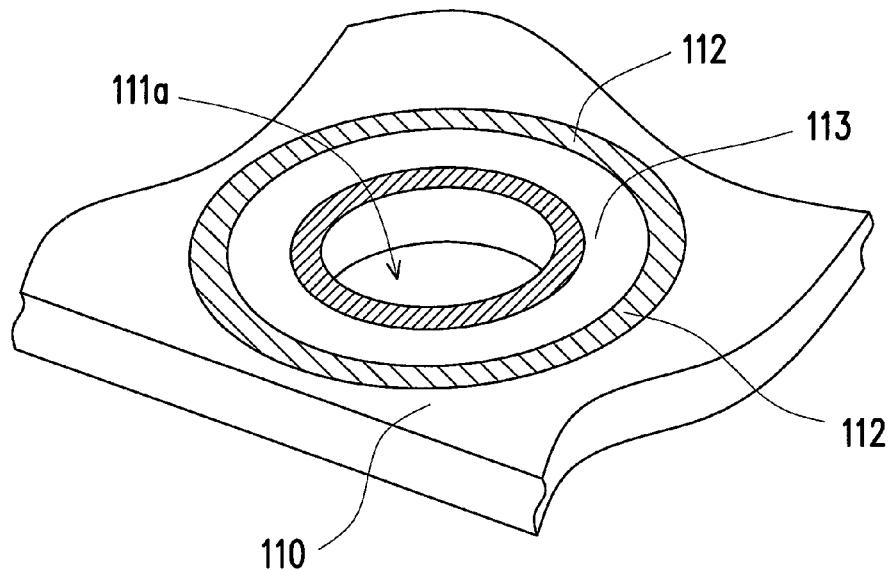
FIG. 5B is a schematic view illustrating the circuit board of FIG. 5A.
Figure 5C:
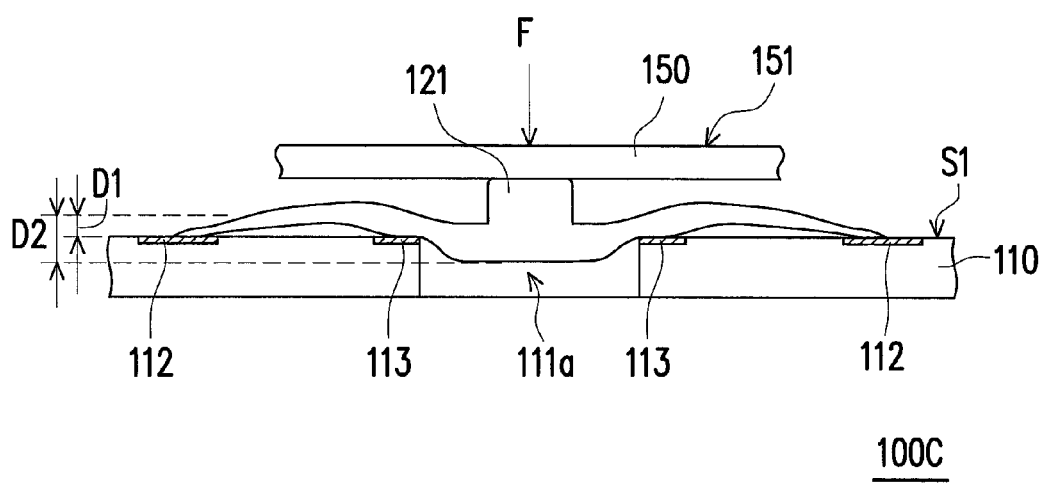
FIG. 5C is a partial cross-sectional view illustrating the touch pad module under an external force of FIG. 5A.

FIG. 5A is a partial cross-sectional view of a touch pad module according to another embodiment of the invention. FIG. 5B is a schematic view illustrating the circuit board of FIG. 5A. FIG. 5C is a partial cross-sectional view illustrating the touch pad module under an external force of FIG. 5A. Referring to FIG. 5A and FIG. 5B. A difference between a touch pad module 100C of FIG. 5A and the aforesaid touch pad module lies in that: in the touch pad module 100C of the present embodiment, a recess area 111a located in the circuit board 110 is a through hole, for example, formed in the circuit board 110 by a mechanical drilling or a laser drilling. Moreover, the ground area 112 and the touch and press operation area 113 are located on a same plane (i.e. the first surface S1) of the circuit board 110. More specifically, the touch and press operation area 113 is disposed between the ground area 112 and the recessed area 111a, and the touch and press operation area 113 surrounds a periphery of the recessed area 111a to form a concentric pattern.

As shown in FIG. 5C, when a user presses the touch surface 151, the touch pad 150 is contacted against the trigger element 120 by the external force F so as to contact against the protrusion portion 121 by moving down the touch pad 150, such that the trigger element 120 deforms by receiving the external force F, and at least a part of the trigger element 120 moves in the recessed area 111a due to deformation, and is further contacted against the touch and press operation area 113 surrounding the periphery of the recessed area 111a. Therefore, the touch and press operation area 113 and the ground area 112 are electrically connected through the trigger element 120 to generate an operating signal. In other words, the trigger element 120 of the present embodiment has the maximum amount of deformation D2 greater than the gap D1, such that the user feels a better and more definite pressing sensation when operating the touch pad module 100C. Moreover, the recessed area 111a is designed to be a through hole to prevent a hermetic space from being formed between the trigger element 120 and the recessed area 111a, and further to effectively reduce noises caused by movements of the trigger element 120.

Figure 6A:
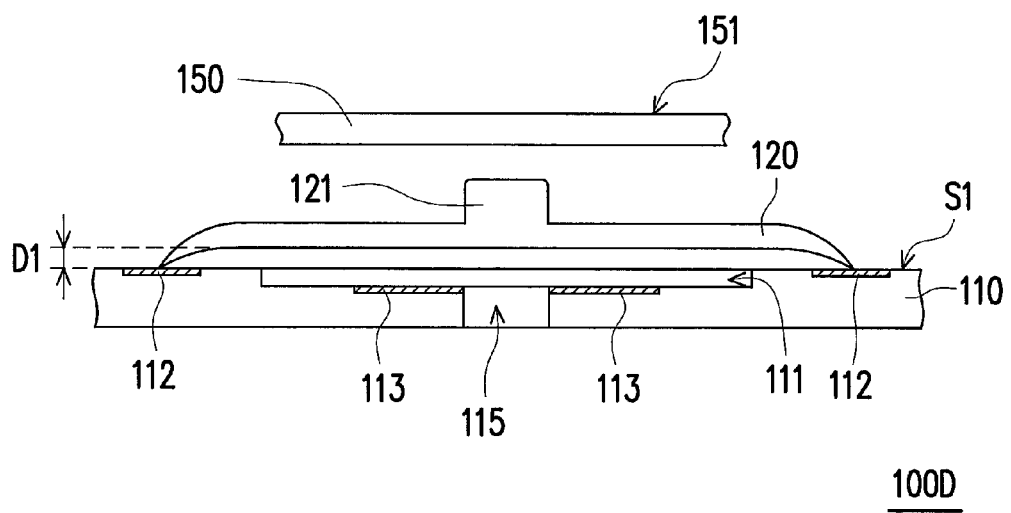
FIG. 6A is a partial cross-sectional view of a touch pad module according to yet another embodiment of the invention.
Figure 6B:
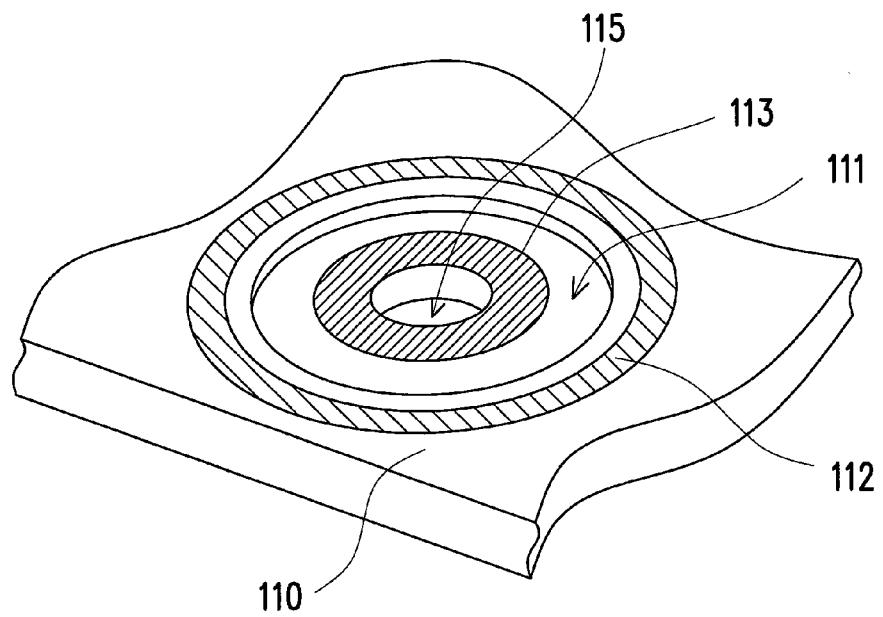
FIG. 6B is a schematic view illustrating the circuit board of FIG. 6A.
Figure 6C:
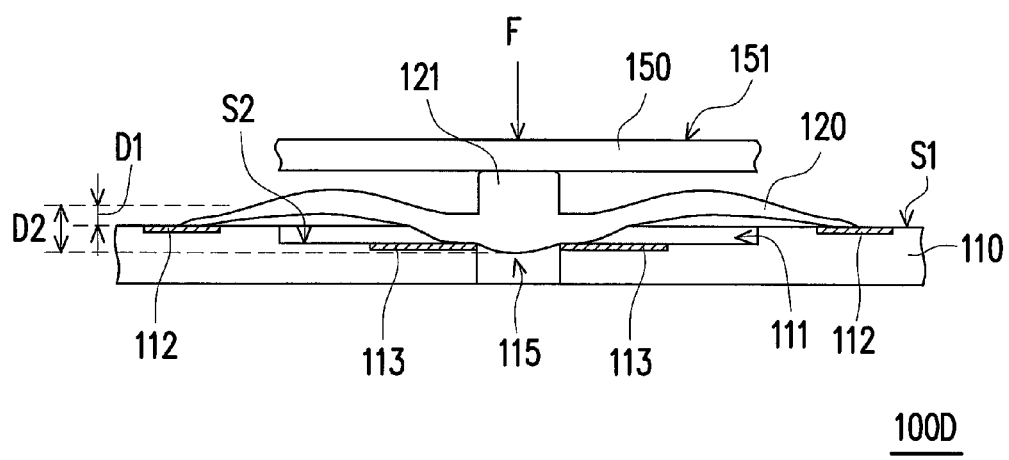
FIG. 6C is a partial cross-sectional view illustrating the touch pad module under an external force of FIG. 6A.

FIG. 6A is a partial cross-sectional view of a touch pad module according to yet another embodiment of the invention. FIG. 6B is a schematic view illustrating the circuit board of FIG. 6A. FIG. 6C is a partial cross-sectional view illustrating the touch pad module under an external force of FIG. 6A. Referring to FIG. 6A and FIG. 6B. A difference between a touch pad module 100D of the present embodiment and the touch pad module of the aforesaid embodiment lies in that: in the touch pad module 100D of the present embodiment, the circuit board 110 has a through hole 115. More specifically, in the present embodiment, the through hole 115, for example, is located in the recessed area 111, and the touch and press operation area 113 surrounds a periphery of the through hole 115. Generally speaking, the through hole 115, for example, is formed on the circuit board 110 by a mechanical drilling or a laser drilling.

As shown in FIG. 6C, when a user presses the touch surface 151, the touch pad 150 is contacted against the trigger element 120 by the external force F so as to contact against the protrusion portion 121 by moving down the touch pad 150, such that the trigger element 120 deforms by receiving the external force F, and at least a part of the trigger element 120 moves in the recessed area 111 due to deformation and is further contacted against the touch and press operation area 113. Therefore, the touch and press operation area 113 and the ground area 112 are electrically connected through the trigger element 120 to generate an operating signal. Specifically speaking, the trigger element 120 of the present embodiment has the maximum amount of deformation D2 greater than the gap D1, and an elastic deformation of the maximum amount of deformation D2 by the trigger element 120 is extended to the through hole 115, such that the user feels a better and more definite pressing sensation when operating the touch pad module 100D. Moreover, the through hole 115 is configured to prevent a hermetic space from being formed between the trigger element 120 and the recessed area 111, and further to effectively reduce noises caused by movements of the trigger element 120.

In summary, the touch pad module of the invention is suitable for being disposed in an electronic device, wherein the touch pad module includes a circuit board and a trigger element. The trigger element is contacted against a ground area of the circuit board and covers a recessed area. When the trigger element deforms by a force, at least a part of the trigger element is located in the recessed area, and the trigger element is further contacted against a touch and press operation area in the recessed area or a touch and press operation area surrounding the recessed area so as to electrically connect to the circuit board and generate an operating signal. In other words, an amount of deformation of the trigger element is greater than a gap between the trigger element and the circuit board. Therefore, a pressing process of the trigger element is substantially increased for the user to feel better pressing sensation when operating the touch pad. In addition, the circuit board further includes an airflow passage or a through hole configured to prevent a hermetic space from being formed between the trigger element and the recessed area to further effectively reduce noises caused by movements of the trigger element.

Although the invention has been disclosed with reference to the aforesaid embodiments, they are not intended to limit the invention. It will be apparent to one of ordinary skill in the art that modifications and variations to the described embodiments may be made without departing from the spirit and the scope of the invention. Accordingly, the scope of the invention will be defined by the attached claims and not by the above detailed descriptions.

What is claimed is:

1. A touch pad module suitable for an electronic device, the touch pad module comprising:
    a circuit board, having a first surface and a recessed area below the first surface;
    a trigger element standing on the first surface of the circuit board across the recessed area; and
    a gap exists between the trigger element and the first surface of the circuit board, and an amount of deformation of the trigger element towards the recessed area is larger than the gap;
    wherein when the trigger element deforms by an external force, at least a part of the trigger element is located in the recessed area; and
    wherein the recessed area includes a through hole, and when the trigger element is deformed by the external force, a bottom portion of the trigger element is located in the through hole.

2. The touch pad module as claimed in claim 1, wherein the circuit board further comprises:
    a ground area surrounding the recessed area, wherein the trigger element is in constant contact with the ground area; and
    a touch and press operation area disposed in the recessed area, wherein when the trigger element being is deformed by the external force, the trigger element contacts the touch and press operation area to electrically conduct the ground area and the touch and press operation area.

3. The touch pad module as claimed in claim 2, wherein the circuit board further comprises an airflow passage connected between the recessed area and a lateral surface of the circuit board.

4. The touch pad module as claimed in claim 2, wherein the circuit board further comprises:
    a through hole located in the recessed area, the touch and press operation area surrounding the through hole.

5. The touch pad module as claimed in claim 1, wherein the circuit board further comprises:
    a ground area surrounding the recessed area, and
    the trigger element being constantly contacted to the ground area; and
    a touch and press operation area disposed between the ground area and the recessed area and surrounding the recessed area, wherein when the trigger element is deformed by the external force, the trigger element and the touch and press operation area are in contact with each other to electrically conduct the ground area and the touch and press operation area.

6. The touch pad module of claim 5, wherein the ground area and the touch and press operation area are located on one same plane of the circuit board.

7. The touch pad module as claimed in claim 1, wherein the trigger element is a metal reed.

8. An electronic device, comprising:
    a housing, having an opening;
    a touch pad, disposed in the housing, a touch surface of the touch pad exposing the housing from the opening;
    a circuit board, disposed in the housing and having a first surface and a recessed area below the first surface; and
    a trigger element, standing on the first surface of the circuit board across a top of the recessed area, and disposed between the touch pad and the circuit board; and
    a gap exists between the trigger element and the first surface of the circuit board, and an amount of deformation of the trigger element towards the recessed area is larger than the gap;
    wherein when the trigger element deforms by an external force, at least a part of the trigger element is located in the recessed area; and
    wherein the recessed area includes a through hole, and when the trigger element is deformed by the external force, a bottom portion of the trigger element is located in the through hole.

9. The electronic device as claimed in claim 8, wherein the circuit board further comprises:

a ground area surrounding the recessed area, wherein the trigger element is in constant contact with the ground area; and a touch and press operation area, located in the recessed area, wherein when the trigger element is deformed by the external force, the trigger element contacts the touch and press operation area to electrically conduct the ground area and the touch and press operation area.

10. The electronic device as claimed in claim 9, wherein the circuit board further comprises an airflow passage, connected between the recessed area and a lateral surface of the circuit board.

11. The electronic device as claimed in claim 9, wherein the circuit board further comprises:

a through hole, located in the recessed area, the touch and press operation area surrounding the through hole.

12. The electronic device as claimed in claim 8, wherein the circuit board further comprises:

a ground area, surrounding the recessed area, and the trigger element being constantly contacted against the ground area; and a touch and press operation area disposed between the ground area and the recessed area and surrounding the recessed area, wherein when the trigger element is deformed by the external force, the trigger element and the touch and press operation area are in contact with each other to electrically conduct the ground area and the touch and press operation area.

13. The electronic device as claimed in claim 12, wherein the ground area and the touch and press operation area are located on one same plane of the circuit board.

14. The electronic device as claimed in claim 8, wherein the trigger element is a metal reed.

* * * * *